United States Patent [19]
Doellinger et al.

[11] Patent Number: 5,513,355
[45] Date of Patent: Apr. 30, 1996

[54] CONTROL SYSTEM OF A SWITCHING SYSTEM

[75] Inventors: Carl-Heinz Doellinger, Germering; Martin Wollensak, Muenchen, both of Germany

[73] Assignee: Siemens Aktiengesellschaft, Munich, Germany

[21] Appl. No.: 16,149

[22] Filed: Feb. 5, 1993

[30] Foreign Application Priority Data

Aug. 27, 1992 [DE] Germany .............................. 9211546 U

[51] Int. Cl.⁶ ...................................................... G06F 15/76
[52] U.S. Cl. ........................ 395/650; 364/281.3; 364/284; 364/DIG. 1
[58] Field of Search ...................................... 395/650, 700, 395/800

[56] References Cited

U.S. PATENT DOCUMENTS 5,287,537  2/1994  Newmark et al. ....................... 395/800

Primary Examiner—Kevin A. Kriess
Assistant Examiner—John I. Chavis
Attorney, Agent, or Firm—Hill, Steadman & Simpson

[57] ABSTRACT

A control system for a switching system that is optimally flexible. In order to achieve this goal, the operating system of the control system contains a services management system that makes it possible for service processes to utilize other service processes for the implementation of their services without knowing their location in the control system.

19 Claims, 4 Drawing Sheets

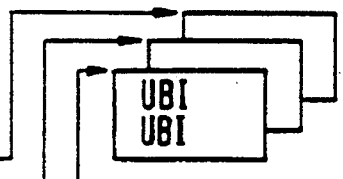

CONTROL SYSTEM OF A SWITCHING SYSTEM

BACKGROUND OF THE INVENTION

The call-handling capacity and capability of a switching system, that is to be expanded or modified, are highly dependent on the flexibility of the control system.

SUMMARY OF THE INVENTION

It is an object of the present invention to provide an improved flexible control system for a switching system.

This object is achieved by a control system for a switching system, the control system having the following elements: at least one control processor; one operating system per control processor that controls, administers and monitors resources of the switching system; at least one service module per control processor that respectively contains at least one service that can be repeatedly introduced on a plurality of control processors and/or can be repeatedly introduced on one control processor and that can request a service of a different service module for the implementation of one of its services; and a services management system that is respectively contained in the operating system and that informs a service module that requests a specific service about a communication path over which communication can be undertaken to a selected service module that contains the requested service.

With the services management system of the present invention, the service modules can now request a service or, to be more precise, a communication path to a service in a simple manner by specifying the name of the service without knowing its location within the control system. A communication relationship between a calling service and a service to be called in is thus dynamically set up. This creates the basis for an unproblematical variability of the configuration of the control system during operation.

In a development of the present invention a service module is introduced into the control system on a plurality of control processors and/or repeatedly on one control processor without interrupting the operation of the control processors. This development makes it possible to dynamically expand the control system. Further, old service modules can be dynamically removed from the system given this development, in that the steps for installing new service modules are applied in reversed direction.

In a further development of the present invention an introduced performance module is replicated on a plurality of control processors and/or is repeatedly replicated on one control processor without interrupting operation of the control processors. This development makes it possible to dynamically modify the local distribution of the installed service modules, in that the service modules are multiplied at the new locations, whereas the service modules at the original location are placed out of service.

In another development of the present invention the services management system implements selection of a service module for a requested service dependent on load conditions of the control processors. What this development achieves, first, is a more uniform distribution of the load between the processing platforms of the control system and, second, a greater independence with respect to the outage or shut-down of a service module.

In yet a further development of the present invention the service modules realize the communication via the communication path by sending messages. This embodiment enables an asynchronous communication between the calling service module and the called service module.

In yet another development of the present invention the service modules realize the communication via the communication path by calling remote procedures. This embodiment enables synchronous communication between the calling service module and the called service module.

In a further development of the present invention a plurality of service modules are combined to form a service capsule, and a specific budget of resources is respectively allocated to a service capsule. The individual allocation of resources that is possible for a service capsule makes it possible that the resources for such functions that are necessary for the integrity and the operation of the system are reserved to an adequate extent compared to those functions that are less urgent and require many resources (for example, traffic measurement).

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several figures in which like reference numerals identify like elements, and in which:

FIG. 5 shows the table of services as well as the sequence for modifying the table of services.

DESCRIPTION OF THE PREFERRED EMBODIMENT

Figure 1:
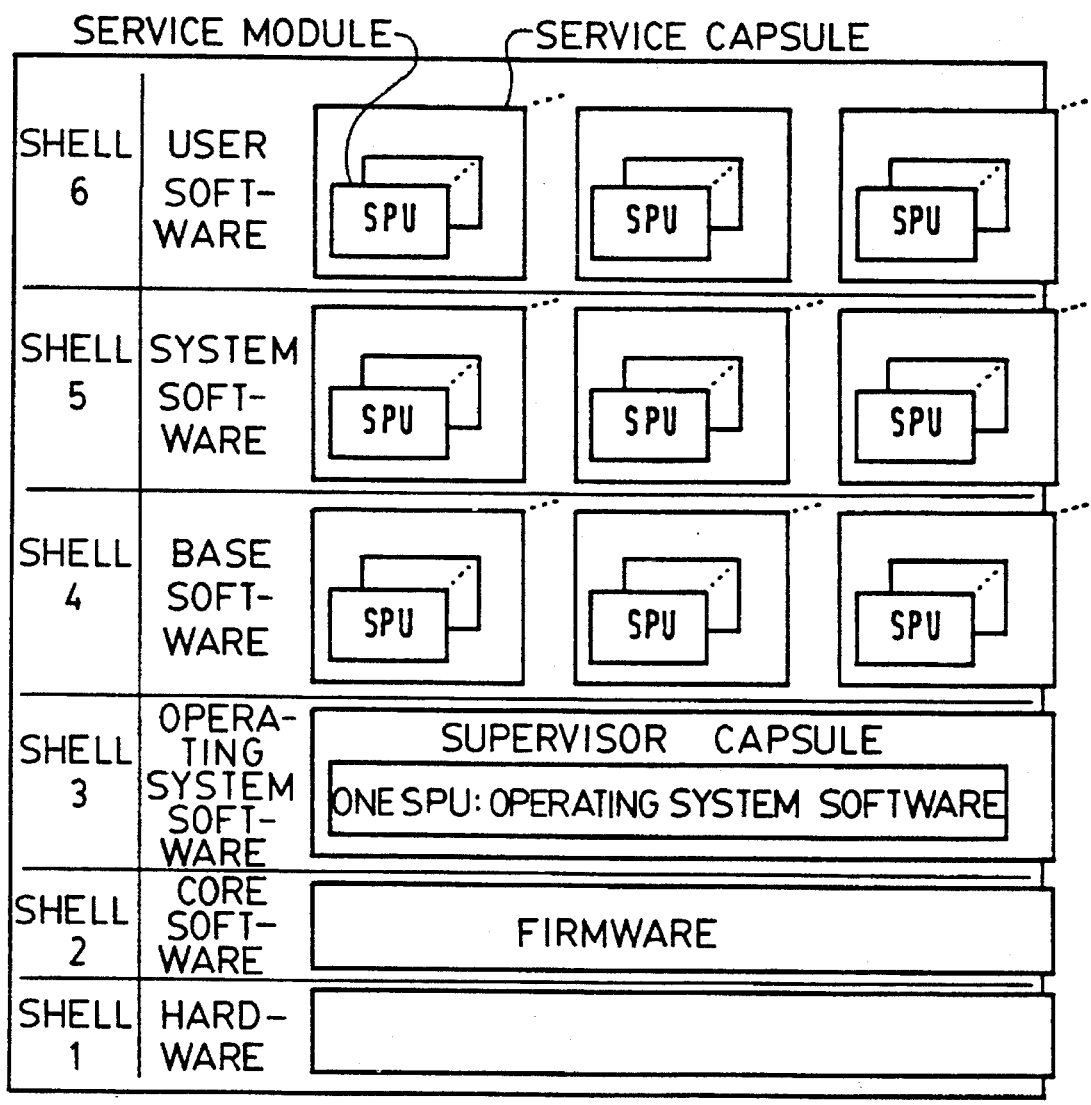
FIG. 1 shows a diagram for processing platforms with system and application software.

FIG. 1 is a diagram of processing platforms of a control system that has the following shells:
A first shell that corresponds to the hardware of the three processing platforms under consideration;
A second shell that corresponds to the firmware (initial program loader, hardware interface, error recognition, etc.) of the processing platform;
A third shell that corresponds to the operating system software (operating system core, error treatment);
A fourth shell that corresponds to the base software (database, overload control, etc.) of the processing platform and that has a plurality of service capsules DLK;
A fifth shell that corresponds to the system software (configuration software, recovery software, etc.) of the processing platform and that likewise has a plurality of service capsules DLK;
A sixth shell that corresponds to the user software (switching technology, ATM cross-connect, protocol sequencing, etc.) of the processing platform and that likewise has a plurality of service capsules DLK.

Only software sequencing above the second shell is combined in service modules SPU and is encapsulated in service capsules DLK. Together, the shells 1 through 3 represent the basic processing platform and are the same for every type of processing platform.

The developer has a larger and more expedient container than the current process available with the service module. A service module is a set of modules and processes that have strong functional relationship to one another and that together make a group of services available to the remaining software or to the subscriber of the switching system. Its components (modules and processes) are guaranteed to be located in the same address space of the memory. Local procedure calls and common memory mechanisms can therefore be used for the communication within a service module.

The service module is a relocatable unit, i.e. it can be moved from one service capsule to another service capsule and can likewise be moved from one processing platform to another processing platform at the production time of the control system. It follows therefrom that the interfaces of a service module must be defined by expressions of inter-process communication (for example, CAST, remote procedures). Every action or every flow of control data between two service modules is initiated by the delivery of messages. The communication between service modules thus occurs exclusively via the operating system. Over and above this, the design and the implementation of a service module are "location transparent", i.e. a service module need not have any knowledge of the processing platform on which it sequences and on which processing platforms run potential communication partners.

Further, a service module can be multiplied, so that the same service module can appear both on a plurality of control processors as well as repeatedly on a single control processor. The replication can occur both at the time the system is produced or even during the running time of the system. Due to the same replicatability of a service module, the flexibility of the system is enhanced with respect to the load distribution and the expandability.

The service module plays two different parts within the system. First, it can execute services for other service modules or, second, it can request services from other service modules. In the former instance, it serves as server, whereas the client is involved in the latter instance. Some service modules can act exclusively as servers, whereas others in turn exclusively act as clients. In general, however, a service module plays both parts.

In order for a service module to make use of the services of a different service module, it must know what services are made available by the server service module. To this end, every service module makes available what are referred to as service interfaces, services that the service module makes available within the system being described therein. After a service module has been loaded into the system, these service interfaces are made known to the operating system, so that other service modules can make use of the services of the loaded service module via the operating system beginning at this time.

A service interface contains the name and type of the service, a group of remote procedures and remote buffers, as well as further data objects that specify the appertaining service, for example partition.

The service module represents an autonomous device for system production that is called by other service modules via its service interfaces. After the installation of this device within the system, it can be combined with other service modules in various ways in order to offer new system services. This principle is also the foundation for standard modules for software production that correspond to the momentary standardization of intelligent networks.

A further software container, namely a service capsule DLK, shall be set forth in greater detail below.

The service capsule has a group of service modules to which a specific allocation of resources (for example, protected address space, two memories, timer) are made available in common. A service capsule can be introduced into the system on-line, i.e. without interrupting operations, or can be replaced by an expanded version.

New systems or performance features tailored to customers can be created by the combination of service modules into service capsules. Over and above this, it is possible to attach modified or completely new service modules to existing service capsules. The fact that service interfaces can be maintenanced enables the production of new combinations at low cost and in a short time. Over and above this, the testing and maintenance of a service module can be implemented as isolatable function units. As a result thereof, overlapping function tests can be reduced in scope and complexity, this further reducing the development costs.

The expansion of operating exchanges by adding service capsules is one means of reducing development costs and thereby obtaining competitive advantages. In this way, the network operator can quickly introduce new performance features into the network with reduced logistics. The new features can be added into existing or into new processing platforms. The following steps are required in both instances. In a first step, the service capsule is produced off-line by combining a plurality of service modules and is subsequently delivered to the corresponding exchanges. In a second step, new processing platform types are produced on-line in a corresponding exchange. In a third step, the loading of new capsules into existing processing platforms is accomplished in order to complete new processing platform types or the loading of complete processing platform types into new processing platforms is accomplished. In a fourth step, finally, the activation of new capsules or of a new processing platform type on the existing or new processing platform is carried out.

On the basis of these steps, a new combination of existing functions can be inserted into the system without disturbing operations. New performance feature software can be introduced in the same way because the operating system treats every service capsule as its own processing unit.

As already mentioned above, communication relationships between the service module are dynamically produced. This function is referred to below as service addressing and is made available by a services management system within the operating system software.

Every implementation of a specific service within a service module is referred to as an entity of a specific service (service type) or, in abbreviated form, is simply referred to as service entity. The services made available by a service module on the basis of corresponding service entities are made known to the system in service interfaces that have already been mentioned. A corresponding service interface is thereby present for every service entity, this service interface being exported by the respective service module and being explained in a specification (brief explanation with Syntax and Semantics).

Whenever a service entity of a service module wishes to set up a communication relationship with a different service entity of a different service module for the purpose of implementing a service, then it implements a call to the services management system via the operating system, the name of the type of the requested service and, potentially, additional criteria for the selection of a server service module being recited in this services management system.

Additional selection criteria that are possible are:
own processing platform, i.e. least dynamic outlay; partitions that limit the service to a specific data area or resource area; and explicit indication of the processing platform and/or of the service capsule.

As a result of the call, the calling client service entity is given back what is referred to as a communication path, with whose assistance the communication to the selected server service entity can be taken up. A communication path is a matter of a data field that essentially contains remote references (RPCs and CAST) to the selected server service entity. The actual communication is then implemented by sending messages (cast) or calling remote procedures (RPC).

Figure 2:
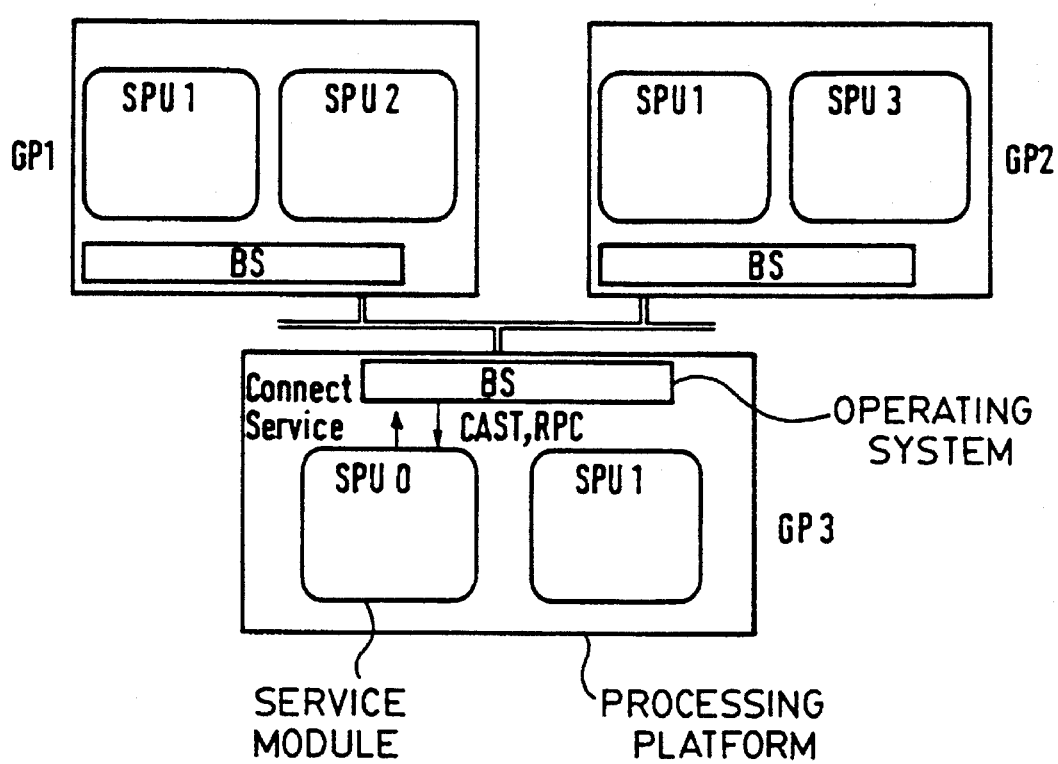
FIG. 2 shows the request of a specific service on the basis of a corresponding call to the services management system of the operating system.

FIG. 2 shows the request of a specific service by the call "connect service" to the services management system of an operating system BS. This call ensues in FIG. 2 within a processing platform GP3 of a control system that also has two further processing platforms GP1 and GP2. As a result of this call, the calling service entity of the service module SPUO receives a reference to the service interface of a service entity that can execute the requested service. Among other things, this service interface contains a collection of remote references by means of which the communication with the service entity selected by the services management can be implemented in the form of messages (cast) and remote procedure calls (RPC).

In the selection of a suitable service entity, the services management system takes into consideration load and maintenance conditions of those platforms on which suitable service entities are situated. The services management system takes the information about these platform statuses from its own, local status table that is regularly updated by the overload handling system and by the maintenance system.

Figure 3:
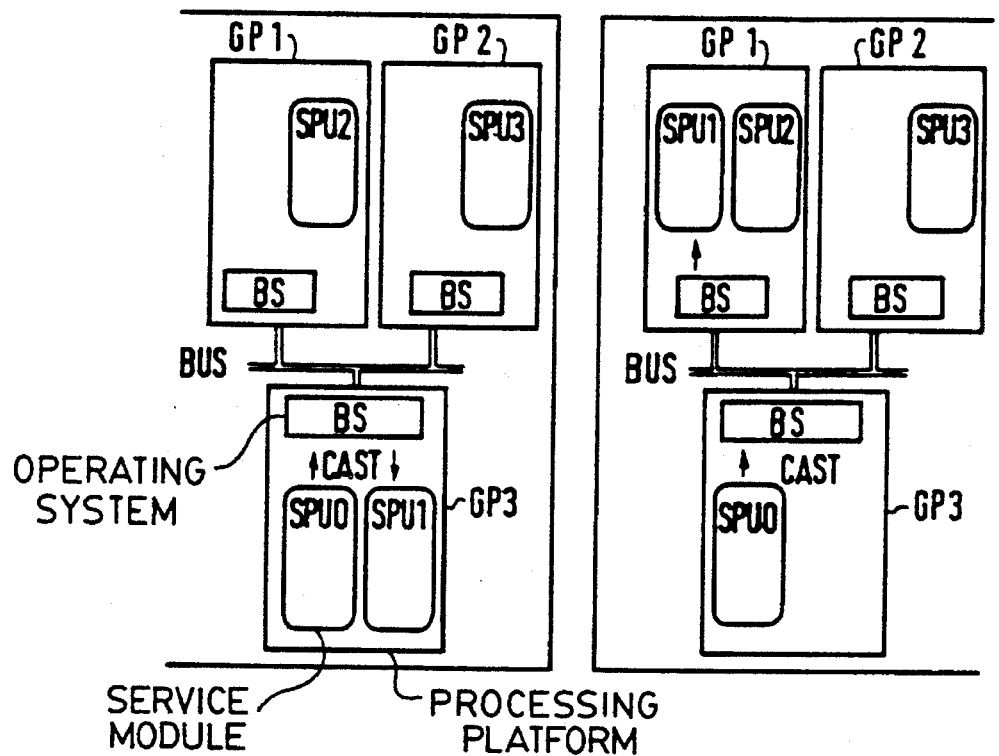
FIG. 3 shows the communication between two service entities using signaling messages.

FIG. 3 shows the communication between two service entities by means of messages. In the case of the control system at the left-hand side of FIG. 3, the requesting service entity is located in the service module SPUO of the control processor GP3 and the selected service entity is located within the service module SPU1 of the same control processor. In the case of the control system at the right-hand side of FIG. 3, the requesting service entity is located in the service module SPU0 of the control processor GP3 and the selected service entity is located in the service module SPU1 of the control processor GP1.

Figure 4:
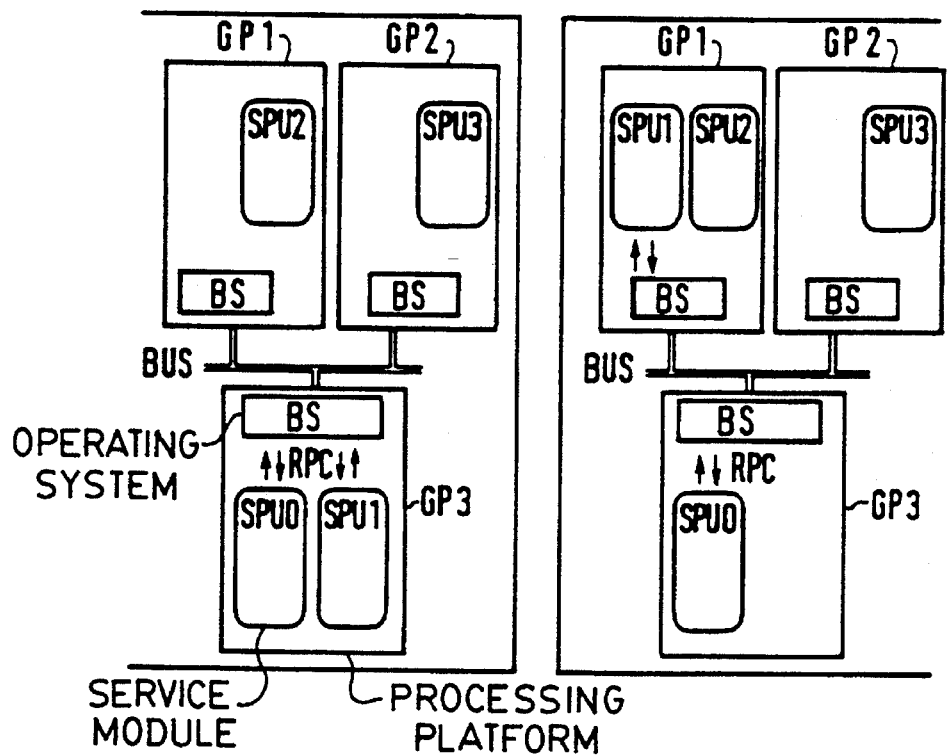
FIG. 4 shows the communication between two service entities using remote procedure calls.

FIG. 4 shows the communication between two service entities by means of remote procedure calls (RPC). The local position of the requesting service entity and of the requested service entity within the two illustrated control systems is identical to the local position already shown in FIG. 3.

A client service entity and a server service entity are in the position to store status information about their communication sequence, since every communication event between the two would otherwise have been initiated by a renewed call "connect service". Situations can now be present wherein the communication relationship between the server service entity and the client service entity can still exist at the time of an outage or of a shut-down of the server service entity because of a maintenance. When the client service entity attempts a further communication event in such a case, for example by sending messages to the server service entity, then it receives a corresponding error message from the inter-process communication. This means that the communication relationship has been cleared down on the part of the server service entity. The client service entity must now again set up a communication relationship to a suitable server service entity in order to continue the implementation of the service. The error message of the inter-process communication contains particular information as to whether a non-availability of the server service entity (because of maintenance overload) or whether an error of the addressed buffer (for example, because of the conclusion of a soft shut-down) is involved.

In the case of a soft deactivation of a service module because of expansion, old, existing communication relationships can be preserved over a bridging time span, whereas what is referred to as an expansion character is returned to a client service entity as an optional parameter outside the communication path for taking up a first-time communication relationship on the basis of the call "connect service". This expansion character is then part of the message header of every message in the inter-process communication. Given this, soft expansion both the old service entity as well as the new service entity are available during the expansion time and the expansion character is used to indicate whether communication should be carried out with the old server service entity or with the new server service entity.

From a functional point of view, a distinction can be made among the service entities between replicated service entities of one service and partitioned service entities of one service. Replicated service entities respectively arise by the replication of an entire service module. Partitioned service entities of one service have the same type of service interface as replicated service entities of the same service, but implement the service for a different area of data or for a different set of resources (for example, a file service can be executed for a semiconductor memory or for a magnetic store). The server service entities have what is referred to as a partition identifier in order to be able to distinguish between partitioned service entities.

Replicated service entities have the same type of service interface and have the same partition identifier since they implement the corresponding service for the same area of data and for the same set of resources. Replicated service entities can be present on different processing platforms and can have identical or different implementation. The services management uses a specific selection algorithm for the selection of a service entity, this specific selection algorithm taking the load conditions and recovery conditions of the processing platforms into consideration in order to promote an optimum load distribution and fault tolerance. These selection algorithms are not visible for the requesting service entities. The client service entity thus no longer need distinguish between replicated service entities of the same service.

Seen from the point of view of the programming language, a service interface involves a specific data type by which a service or, to be more precise, a specific service type is described. Among other things, the data type contains a collection of remote references (remote procedure calls RPC and buffers) dependent on the service type, these being also referred to below as communication path. Every declaration of a variable of the data type (service type) corresponds to the production of a service entity. This production has the static initialization of the remote references.

A service entity is unambiguously specified within the system by a service type identifier, by a partition identifier, by a capsule identifier and by a service module identifier.

The service type identifier is produced by the support software, to be more precise by what is referred to as the system linker, being produced during the production time or running time of the system. Such a service type identifier is allocated to every declared service variable. On the basis of the allocation, the declared service variable is now known within the system as an entity of a specific service. All service entities whose variable type (service type) and variable name are identical receive the same service type identifier within the system. An entity of a specific service can never change its service type identifier.

The partition identifier of a service entity is likewise produced at the production time (static notification) or at the running time (dynamic notification). The type of the partition identifier is an area of data or a set of resources and is defined within the first component of the data type "service type".

The partition identifier makes it possible for the user service entity to distinguish between a plurality of service entities. All service entities of a specific service that have the same partition identifier represent replicated service entities as seen from the point of view of the services management system. All service entities of a specific service having different partition identifiers represent partitioned service entities as seen from the point of view of the services management system.

It is possible to modify a previously allocated partition identifier for a service entity during the running time. However, this is only possible for service entities whose allocation of a partition identifier ensued in a dynamic way (dynamic notification).

The capsule identifier and the service module identifier describe the position of a service entity within the entire system. Every service entity thus has an unambiguous, local position within the system. It is not allowed to repeatedly generate the same entity of a service within a service module (restriction for the compiler). However, it is allowed to allocate an additional partition identifier to a specific service entity. Thus restriction means that it is not possible to have more than one service entity of a specific service within a specific service module.

The service module identifier is produced by the linker and given to the off-line system builder. The capsule identifier is generated by the off-line system builder. The capsule identifier and the service module identifier are given to the on-line system builder by the off-line system builder in the form of tables. These tables are used by the on-line system builder when it generates what are referred to as tables of services.

Every service entity has an unambiguous local position within the system. This local position is described by a location identifier (capsule identifier and service module identifier). The services management allows a plurality of service entities of a specific service, i.e. of a specific service interface type, to have the same location identifier as long as they do not have the same partition identifier.

A service entity can be called in by a remote procedure call RPC or by a message (cast) in one of the buffers of the service entity. The call of a service entity of a specific service beyond the boundaries of a service capsule is implemented by a corresponding field of remote references (buffer references and RPC references) and by the use of corresponding communication devices of the operating system. The call of an entity of a specific service within a service capsule is implemented by the use of a field to local references (indicators to buffers and procedures). The size of such a field is dependent on the plurality of components of a service.

It is the function of the services management system, in response to a request for a service, to select a corresponding service entity for the implementation of the requested service and to assign its communication path (field of references) to the requesting service entity. This request of a service is effected with the systems of the operating system call "connect service". The operating system call calculates the communication path in that it looks in various tables. The tables that are most important in this context are a static table of services and a trenchant table of services. The elements of these tables are the service identifiers, the capsule identifiers, the service module identifiers, the partition identifiers and, finally, the communication paths.

The service type identifier is absolutely necessary as a parameter within the operating system call "connect service". Other parameters such as, for example, the partition identifier or the identifiers with respect to local position (capsule identifier or service module identifier) are optional parameters. When the operating system call is successful, a data field (as already mentioned) with remote references (communication path) is returned to the calling service entity.

For the implementation of its function, the services management system uses these tables of services which contain information about the available services of the system, about the service entities existing for the implementation of this services and about the communication paths belonging to the service entities. These tables of services are generated by tools of the support software that work both off-line as well as on-line.

The tables of services that are generated contain information about the various processing platforms of the control system and about the available service entities on the existing processing platforms.

It is particularly the location identifiers that are produced by an on-line tool. The location identifiers are used by the inter-process communication and by the inter-processor communication of the operating system. The services management system makes no further assumptions about the location identifiers that are generated. It assumes that the generated location identifiers are valid and offers the inter-process communication, the inter-processor communication and the internal transport protocol information about the destination specifications required by these systems on the basis of the location identifiers.

In order to produce the tables of services, an information forwarding via various tools of the support software is necessary, this being set forth in greater detail below.

During compiling, the compiler first recognizes the declaration of service variables (service entities) and their interface components (buffers, etc.) within the source code. The compiler forwards these information to the linker. After the compilation, these service entities are allocated to a specific type of service module.

The linker than forwards this information to the off-line system builder. After the linking by the linker, these service entities belong to a specific type of service capsule. The service module identifier, which indicates the relative position of the service module within a service capsule, has been defined at this time. Moreover, the relative position of the components of the interfaces of the service entities within a service capsule has already been defined at this time.

The off-line system builder now assigns corresponding service identifiers to the service entities forwarded from the liner. It also generates a specific loading type for every processing platform with which the function of a processing platform is respectively defined. The relative position of a service capsule within a load type has now been defined.

The on-line system builder knows the configuration of the hardware and of the appertaining load types of the processing platforms generated by the off-line system builder. It produces the necessary tables for the services management system therefrom. It knows the relationships between the load types and the specific location identifiers of a processing platform. The tables of services that it has produced contains the relationship between service entities, their local position and their appertaining interface components.

FIG. 5 shows the use of the tables of services by the services management system. According to FIG. 5, the services management system DMS contains a table ST of services for the implementation of its job, the interfaces of entities of service types that have already been made known being stored in this table ST of services. Whenever a service entity wishes to request a service from a different service module and there is not yet any communication relationship to a corresponding service entity, it forwards the name of the requested service type, for example the name "service 1" to the services management system. The services management system contains the names of services (service types) that have already been made known in a table of service names within the table ST of services and also contain the location identifiers and partition identifiers in an entity table for those service entities that implement this service. On the basis of the name forwarded by the requesting service module, the services management system can thus select that service module from the possible service modules that is most suitable in view of an optimum load distribution and that contains the requested service and can give the requesting service the corresponding communication path to a data entity of the requested service. The requesting service entity can now take up communication with the appertaining service entity.

Instead of merely indicating the name of the requested service, the requesting service can also recite additional selection criteria, for example the indication of a specific control processor, the indication of a specific entity of a specific service or of a specific service capsule.

A specific service, for example "service 1", can be implemented by a plurality of different entities. Every entity, however, implements the service only for a defined area of data or a defined set of resources. This situation is marked by a partition identifier $ID_p$.

Three services modules, namely SPU1, SPU2 and SPU3, have been introduced into the system in FIG. 5, whereby this is a matter of identical service modules in the case of service modules SPU1 and SPU2 and, thus, at least one of the two service modules has arisen by replication. As a consequence of the identity of the two service modules, services of the two service modules, for example "service 1", that correspond to one another also have the same partition identifiers $ID_p$.

After the introduction of a service module into the system, whether it be my loading or by replication, the services of the newly introduced service module are made known to the services management system DMS, the execution thereof to be now set forth in greater detail.

On the basis of a request "announce service" that is forwarded from a requesting entity to the services management system, the location identifiers (capsule identifier and service module identifier) are taken from the process control block of the calling entity in a first step.

The service type identifier and the partition identifier are co-forwarded as parameters in the request "announce service". For services that are dynamically made known, i.e. made known at the running time of the system, a separate process is available in every service module and this can only respectively announce services of its own service module. This process can announce a plurality of partition identifiers per service entity.

In a second step, the services management now looks at the entity table within the table of services that is relevant with respect to the service type on the basis of the forwarded service type identifier and of the location identifier. When the partition identifier forwarded in the request is already defined in the entity table, nothing occurs, and a corresponding return value is returned to the calling entity. When, however, no corresponding service entity having the same partition identifier is found in the entity table, the request is implemented, i.e. the new partition identifier is entered into the partition list within the entity table and a corresponding return value is returned thereupon to the entity requesting the notification.

In a third step, the publication of a service entity that has just occurred within a specific processing platform must also be distributed to the remaining processing platforms. To that end, the publication information of the new service entity must first be stored in a local intermediate memory table before they are sent to the services management systems of the other processing platforms by a multi-cast communication after a suitable time span. If the local intermediate memory table has already exceeded a defined filling degree before the suitable time span, a multi-cast communication on operating system level is likewise triggered.

There is an inverse operation for cancelling the publication of a new service entity that exists for the procedure that was just described for publishing a new service entity within the control system. This reverse operation is triggered by the operating system call "withdraw service" and is implemented in a way analogous to the above-explained procedure of publication.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A control system for enabling communication between service module means, comprising:

at least one control processor;

a plurality of service module means for effecting services, said service module means executing services for other service module means and requesting service from said other service module means;

means for interfacing said service module means;

the at least one control processor having an operating system;

the at least one control processor having at least one service module means that respectively contains at least one service and that contains means for requesting a service of a different service module means for implementation of one of its services; and a communication path linking said at least one service module means to said different service module means;

the operating system having a services management system having means for informing the at least one service module means that requests a specific service about said communication path over which communication can be undertaken to the different service module means that contains the requested specific service.

2. The control system according to claim 1, wherein the control system has a plurality of control processors and a plurality of service module means, and wherein a service module means is inserted into the plurality of control processors and/or into the at least one control processor without interrupting the operation of the plurality of control processors.

3. The control system according to claim 1, wherein the control system has a plurality of control processors and a plurality of service module means, and wherein an inserted service module means is replicated on the plurality of control processors and/or is replicated on the at least one control processor without interrupting operation of the plurality of control processors.

4. The control system according to claim 1, wherein the services management system implements selection of a service module means for a requested service dependent on load conditions of the at least one control processor.

5. The control system according to claim 1, wherein the at least one service module means communicates with the different service module means via the communication path by sending messages.

6. The control system according to claim 1, wherein the at least one service module means communicates with the different service modules via the communication path by calling remote procedures.

7. The control system according to claim 1, wherein the plurality of service module means are combined to form a service capsule, and wherein a specific allocation of resources is respectively allocated to a service capsule.

8. A control system for enabling communication between service module means, comprising:

a plurality of control processors;

a plurality of service module means for effecting services, said service module means executing services for other service module means and requesting service from said other service module means;

means for interfacing said service module means;

each of said control processors having an operating system;

each of said control processors having at least one service module means that respectively contains at least one service, said at least one service module means being insertable into at least one of the plurality of control processors, and said at least one service module means having means for requesting for a service of a different service module means for implementation of one of its services; and a communication path linking said at least one service module means to said different service module means;

each of the operating systems having a services management system having means for informing said at least one service module means that requests a specific service about said communication path over which communication can be undertaken to said different service module means that contains the requested service.

9. The control system according to claim 8, wherein the control system has means for inserting a service module means into a plurality of control processors and/or one control processor without interrupting operation of the control processors.

10. The control system according to claim 8, wherein the control system has means for replicating an inserted service module means on the plurality of control processors and/or replicating an inserted service module means on one control processor of the plurality of control processors without interrupting operation of the control processors.

11. The control system according to claim 8, wherein the services management system has means for implementing selection of a service module means for a requested service dependent on load conditions of the plurality of control processors.

12. The control system according to claim 8, wherein the service module means communicate via the communication path by sending messages.

13. The control system according to claim 8, wherein the service module means communicate via the communication path by calling remote procedures.

14. The control system according to claim 8, wherein a number of service module means of the plurality of service modules are combined to form a service capsule, and wherein a specific allocation of resources is respectively allocated to the service capsule.

15. A control system for enabling communication between service module means, comprising:

a plurality of control processors;

a plurality of service module means for effecting services, said service module means executing services for other service module means and requesting service from said other service module means;

means for interfacing said service module means;

each of said control processors having an operating system;

each of said control processors having at least one service module means that respectively contains at least one service, said at least one service module means being insertable into the plurality of control processors and/or into one control processor without interrupting operation of the control processors, and said at least one service module means having means for requesting a service of a different service module means for implementation of one of its services; and a communication path linking said at least one service module means to said different service module means;

each of the operating systems having a services management system having means for informing said at least one service module means that requests a specific service about said communication path over which communication can be undertaken to a selected service module means that contains the requested service, the services management system having means for implementing selection of a service module means for a requested service dependent on load conditions of the control processors.

16. The control system according to claim 15, wherein the control system has means for replicating an inserted service module means on the plurality of control processors and/or replicating an inserted service module means on one control processor of the plurality of control processors without interrupting operation of the control processors.

17. The control system according to claim 15, wherein the service module means communicate via the communication path by sending messages.

18. The control system according to claim 15, wherein the service module means communicate via the communication path by calling remote procedures.

19. The control system according to claim 15, wherein a number of service module means of the plurality of service modules are combined to form a service capsule, and wherein a specific allocation of resources is respectively allocated to a service capsule.

* * * * *